United States Patent
Ikeda et al.

(10) Patent No.: US 7,174,702 B2
(45) Date of Patent: Feb. 13, 2007

(54) CABLE OR THE LIKE PROTECTION AND GUIDE DEVICE

(75) Inventors: Masaaki Ikeda, Osaka (JP); Shoichiro Komiya, Osaka (JP); Takayuki Matsuda, Osaka (JP)

(73) Assignee: Tsubakinoto Chain Co., Osaka (JP)

( * ) Notice: Subject to any disclaimer, the term of this patent is extended or adjusted under 35 U.S.C. 154(b) by 395 days.

(21) Appl. No.: 10/866,915

(22) Filed: Jun. 14, 2004

(65) Prior Publication Data

US 2005/0029393 A1    Feb. 10, 2005

(30) Foreign Application Priority Data

Aug. 5, 2003    (JP) .............................. 2003-286892

(51) Int. Cl.
*F16G 13/16*    (2006.01)
(52) U.S. Cl. ............................. 59/78.1; 248/49; 248/51
(58) Field of Classification Search .................. 59/78.1; 248/49, 51

See application file for complete search history.

(56) References Cited

U.S. PATENT DOCUMENTS

| 3,503,578 | A | * | 3/1970 | Kurlandsky | .................. | 248/51 |
| 3,782,670 | A | | 1/1974 | Kielma | | |
| 4,658,577 | A | * | 4/1987 | Klein | .......................... | 59/78.1 |
| 5,163,281 | A | * | 11/1992 | Kanehira et al. | ............ | 59/78.1 |
| 5,771,676 | A | * | 6/1998 | Komiya et al. | ............... | 59/78.1 |
| 5,987,873 | A | | 11/1999 | Blase | | |
| 6,688,096 | B2 | * | 2/2004 | Wada et al. | .................. | 59/78.1 |

FOREIGN PATENT DOCUMENTS

| DE | 24 15 374 A1 | 2/1975 |
| JP | 10-510905 | 10/1998 |
| JP | P3115995 | 9/2000 |

* cited by examiner

*Primary Examiner*—David B. Jones
(74) *Attorney, Agent, or Firm*—Woodling, Krost and Rust

(57) ABSTRACT

To provide a cable or the like protection and guide device, which can suppress the sliding contact noise by reliably limiting a linear position and a bending position exhibited during the movement of the cable or the like, and at the same time, which can reduce a setting space by suppressing the impact noise and wear of a connecting pin piece on a connecting pin hole even if the height size of the link body is decreased. A connecting pin piece 13, convexly provided on a link body 10, which forms a cable or the like protection and guide device, includes stopper surfaces 13a, 13a, which are parallel to the upper edge center portion and the lower edge center portion of the side plates 11 and are oppositely disposed across a bending center point O and a pair of front, and rear arc-shaped outer circumferential surfaces 13b, 13b, which are oppositely disposed across the bending center point O. Further a connecting pin hole 14, concavely provided in said link body 10, includes a pair of linear position maintaining surfaces 14a, which are parallel to the upper edge center portion and the lower edge center portion of the side plate 10, and are oppositely disposed across the bending center point O, bending position limiting surfaces 14b, which are oppositely disposed across the bending center point O in a plane symmetry, and a pair of arc-shaped inner circumferential surfaces 14c oppositely disposed across said bending center point O in a plane symmetry to be brought into sliding contact with said connecting pin pieces 13.

2 Claims, 3 Drawing Sheets

CABLE OR THE LIKE PROTECTION AND GUIDE DEVICE

FIELD OF THE INVENTION

The present invention relates to a cable or the like protection and guide device, which accommodates a cable or the like composed of a flexible body such as a cable, a hose or the like, which supplies energy such as electric power, compressed air or the like to a movable machine, and can stably and reliably protect and guide the cable or the like even during the movement of the movable machine.

BACKGROUND

As one example of a cable or the like protection and guide device for protecting and guiding a cable or the like composed of a flexible body such as a cable, a hose or the like, a protection and guide chain has been well known in which lower ends of a pair of upright pieces oppositely disposed are formed in a U-shape in a front view by a bottom plate, a shaft hole is provided in an arc-shaped front portion of each upright piece, a number of link members each provided with a shaft by protruding the shaft from an outside surface to an arc-shaped rear portion of the upright piece, are articulably connected with each other by fitting said shaft into said shaft hole between the adjacent link members, and a stopper mechanism is provided at the connecting portion to limit the bending angle of said link body, and in which a stopper pawl on said shaft and a stopper hole portion to limit a movable range of said stopper pawl is provided in said shaft hole.

Patent Reference 1: Publication of Japanese Patent No. 3115995 (on page 1, FIGS. 3 to 5).

PROBLEMS TO BE SOLVED BY THE INVENTION

However, in the conventional protection and guide chain disclosed in the above-mentioned publication of Japanese patent No. 3115995, the size of the outer diameter of the shaft protruding at the arc-shaped rear portion of the upright portion or the shaft form limited by the height size of the link member and an arrangement form of the stopper pawl so that they are formed in comparatively small outer diameter size and shaft form. Thus, in a case where the chain was used for a long period of time, sliding wear between the shaft protruding in the arc-shaped rear portion of the upright piece and the shaft hole provided in the arc-shaped front portion of the upright piece, advances, and there was a problem that a tensile strength in the longitudinal direction of the chain is remarkably reduced by sliding wear between the shaft and shaft hole. Further, there was a problem that the more distantly the bottom plate is bridged from the bending center points, which function by the shafts and the shaft holes because the height size of the link body cannot be decreased, the more wobbling of the cable or the like accommodated in connected link members occurs in the vertical direction so that the cable or the like and the bottom plate are brought into sliding contact with each other and the generation of wear becomes easy.

In a case where to decrease a setting space of a protection and guide chain the height size of the link member is particularly designed to be small, since a stopper mechanism comprising a stopper pawl and a stopper hole portion must ensure a setting space, which the stopper mechanism is sufficient to function, the above-mentioned outer diameter size of the shaft and the shaft form have further tight design and there was a problem that the shaft protruding at the arc-shaped rear portion of the upright piece can be damaged. Further, when the above-mentioned outer diameter size of the shaft and the shaft form is designed in a large scale so as to endure use for a long period of time, the size of the outer diameter size of the shaft must be decreased and the surface pressure of the stopper pawl, which receives from the stopper hole portion is increased so that the stopper pawl is liable to wear and damage. Additionally, there was a problem that since the setting position of the stopper pawl is spaced apart from the vicinity of the bending center portion to the radial direction, a collision speed with respect to the stopper hole portion is increased and the collision energy is increased so that impact noise of a stopper pawl becomes more apparent.

Further, since said stopper mechanism is provided at only one position distant from the bending center point, a bending load, which generates in the adjacent link bodies at the bending of the chain, must be shared and an excessive load with respect to a shaft mainly having a pivoting function cannot be avoided. Thus, there is a problem that breakage of the shaft is accelerated.

Accordingly, the problems to be solved by the invention, i.e., the objects of the present invention are to solve problems of the above-mentioned prior arts and to provide a cable or the like protection and guide device, which can suppress the sliding contact noise by reliably limiting a linear position and a bending position exhibited during the movement of the cable or the like, and at the same time, which can reduce a setting space by suppressing the impact noise and wear of a connecting pin piece on a connecting pin hole even if the height size of the link body is decreased.

MEANS FOR SOLVING THE PROBLEMS

The present invention solves the above-described problems by the fact that a cable or the like protection and guide device for protecting and guiding a cable or the like in a cable inserting space, having a number of longitudinal cross-sectional link bodies in each of which a connecting plate is provided, in a laterally bridged manner, at the upper edge center portion and the lower end portion of a pair of the respective side plates oppositely displaced on the right and left sides, in which a connecting pin piece convexly provided on one end side of said side plate in the connecting direction toward a side, and a connecting pin hole concavely provided on the other side of said side plate in the connecting direction are mutually fitted to adjacent link bodies and in which said link bodies are articulably connected to each other, is characterized in that said connecting pin includes a pair of upper and lower stopper surfaces, which are parallel to said upper edge center portion and said lower edge center portion and are oppositely disposed across bending center points of said adjacent link bodies, and a pair of front and rear arc-shaped outer circumferential surfaces which are continuous to said stopper surfaces and oppositely disposed across the bending center point of said adjacent link bodies, and said connecting hole includes a pair of linear position maintaining surfaces, which are parallel to said upper edge center portion and said lower edge center portion and are oppositely disposed across the bending center point of said adjacent link bodies in a plane symmetry to simultaneously abut on said pair of upper and lower stopper surfaces of said connecting pin piece, bending position limiting surfaces, which are formed at a given bending limiting angle to said linear position maintaining surface and are oppositely disposed across the bending center point of said adjacent link bodies in a plane symmetry to simultaneously abut on said pair of upper and lower stopper surfaces of said connecting pin piece, and a pair of arc-shaped inner circumferential surfaces oppositely disposed across said bending center point in a plane symmetry to be rotatably brought into sliding contact with said pair of front and rear arc-shaped outer circumferential surfaces of said connecting pin pieces.

EFFECTS OF THE INVENTION

In the cable or the like protection and guide device according to the present invention, a connecting pin piece, which connects adjacent link bodies to each other, includes a pair of upper and lower stopper surfaces, which are parallel to the upper edge center portion and the lower edge center portion of the pair of side plates oppositely disposed on the right and left sides and are oppositely disposed across a bending center point of said adjacent link bodies, and, a pair of front and rear arc-shaped outer circumferential surfaces which are continuous to said stopper surfaces and oppositely disposed across the bending center point of said adjacent link bodies. Further connecting pin hole, which connects adjacent link bodies while cooperating with said pin piece, includes a pair of linear position maintaining surfaces, which are parallel to the upper edge center portion and the lower edge center portion oppositely disposed on the right and left side, and are oppositely disposed across the bending center point of said adjacent link bodies to simultaneously abut on said pair of upper and lower stopper surfaces of said connecting pin pieces, bending position limiting surfaces, which are formed at a given bending limiting angle to said linear position maintaining surface, and are oppositely disposed across the bending center point of the adjacent link bodies in a plane symmetry to simultaneously abut on said pair of upper and lower stopper surfaces of said connecting pin pieces, and a pair of arc-shaped inner circumferential surfaces oppositely disposed across said bending center point in a plane symmetry to be rotatably brought into sliding contact with said pair of front and rear arc-shaped outer circumferential surfaces of said connecting pin pieces. That is, (1) Since the connecting pin piece, which connects adjacent link bodies to each other, includes a pair of upper and lower stopper surfaces, which are oppositely disposed across a bending center point of said adjacent link bodies, when the cable or the like protection and guide device of the present invention is compared with a conventional protection and guide chain in which a stopper mechanism is provided at only one position spaced apart from a bending center point and impact noise is generated, it can disperse a bending load, which generates in adjacent link members at any time of the linear positioning and bending positioning so that the stress concentration to the bending center portion of a connecting pin piece can be avoided. Thus according to the device of the present invention, impact noise, which is liable to generate in the connecting pin piece can be significantly suppressed and at the same time it suppresses breakage of the connecting pin piece whereby tensile strength can be ensured for a long period of time.

(2) Since the connecting pin piece, which connects adjacent link bodies to each other, includes a pair of front and rear arc-shaped outer circumferential surfaces which are continuous to said stopper surfaces and oppositely disposed across the bending center point of the adjacent link bodies, when the cable or the like protection and guide device of the present invention is compared with a conventional protection and guide chain in which an outer diameter size of a shaft and a shaft form are small design, even if the height size of the link body is decreased, a sufficiently large outer diameter size enough to rotatably sliding contact with an arc-shaped inner circumferential surface of the connecting pin hole can be ensured. Thus, a stable and smooth operation between the linear position and the bending position is realized and at the same time wear between the connecting pin piece and the connecting pin hole can be suppressed. Further, since the height size of the link body having a rectangular cross-section can be decreased, vertical wobbling of the cable or the like accommodated in a number of connected link bodies is suppressed whereby the contact noise is reduced and sliding contact wear between connecting plates disposed at upper and lower end connecting center portions of the link body and the cable or the like.

(3) Since a connecting pin hole, which cooperates with said pin piece, includes a pair of linear position maintaining surfaces, which are parallel to the upper edge center portion and the lower edge center portion oppositely disposed on the right and left side, and are oppositely disposed across the bending center point of said adjacent link bodies in a plane symmetry to simultaneously abut on said pair of upper and lower stopper surfaces of said connecting pin pieces, this linear position maintaining surfaces are supported while abutting on a pair of upper and lower stopper surfaces provided on the connecting pin pieces across the bending center point of said adjacent link bodies in a plane symmetry to simultaneously abut on the pair of upper and lower stopper surfaces of said connecting pin piece. Thus, a linear position exhibited at the movement of the cable or the like can be reliably maintained. Further, since the linear position maintaining surfaces are in a spaced condition in parallel with each other in the vertical plane in a linear position through a bending position, wear and contact noise due to sliding contact, which were generated in a conventional protection and guide chain, can be avoided.

(4) Since a connecting pin hole, which cooperates with said pin piece, includes bending position limiting surfaces, which are formed at a given bending limiting angle to said linear position maintaining surface, and are oppositely disposed across the bending center point of the adjacent link bodies in a plane symmetry to simultaneously abut on said pair of upper and lower stopper surfaces of said connecting pin pieces. Thus, these bending position limiting surfaces are supported while abutting on a pair of upper and lower stopper surfaces provided on the connecting pin pieces across the bending center point of said adjacent link bodies in a plane symmetry, and the bending positions of the adjacent link bodies are fixedly limited at a desired bending limiting angle. Accordingly, the cable or the like can be reliably protected and guided in a cable-inserting space where a number of adjacent link bodies are connected to each other while being bent.

(5) Since a connecting pin hole, which cooperates with said pin piece, includes a pair of arc-shaped inner circumferential surfaces oppositely disposed across said bending center point in a plane symmetry to be rotatably brought into sliding contact with said pair of front and rear arc-shaped outer circumferential surfaces of said connecting pin pieces, when the cable or the like protection and guide device of the present invention is compared with a conventional protection and guide chain in which an outer diameter size of a shaft and a shaft form are small design, even if the height size of the link body is decreased, a sufficiently large outer diameter size enough to rotatably sliding contact with an arc-shaped outer circumferential surface of the connecting pin hole can be ensured. Thus, a stable and smooth operation between the linear position and the bending position is realized and at the same time wear between the connecting pin piece and the connecting pin hole can be suppressed.

The invention will be better understood when reference is made to the BRIEF DESCRIPTION OF THE DRAWINGS, DESCRIPTION OF THE INVENTION AND CLAIMS which follow hereinbelow.

Figure 1:
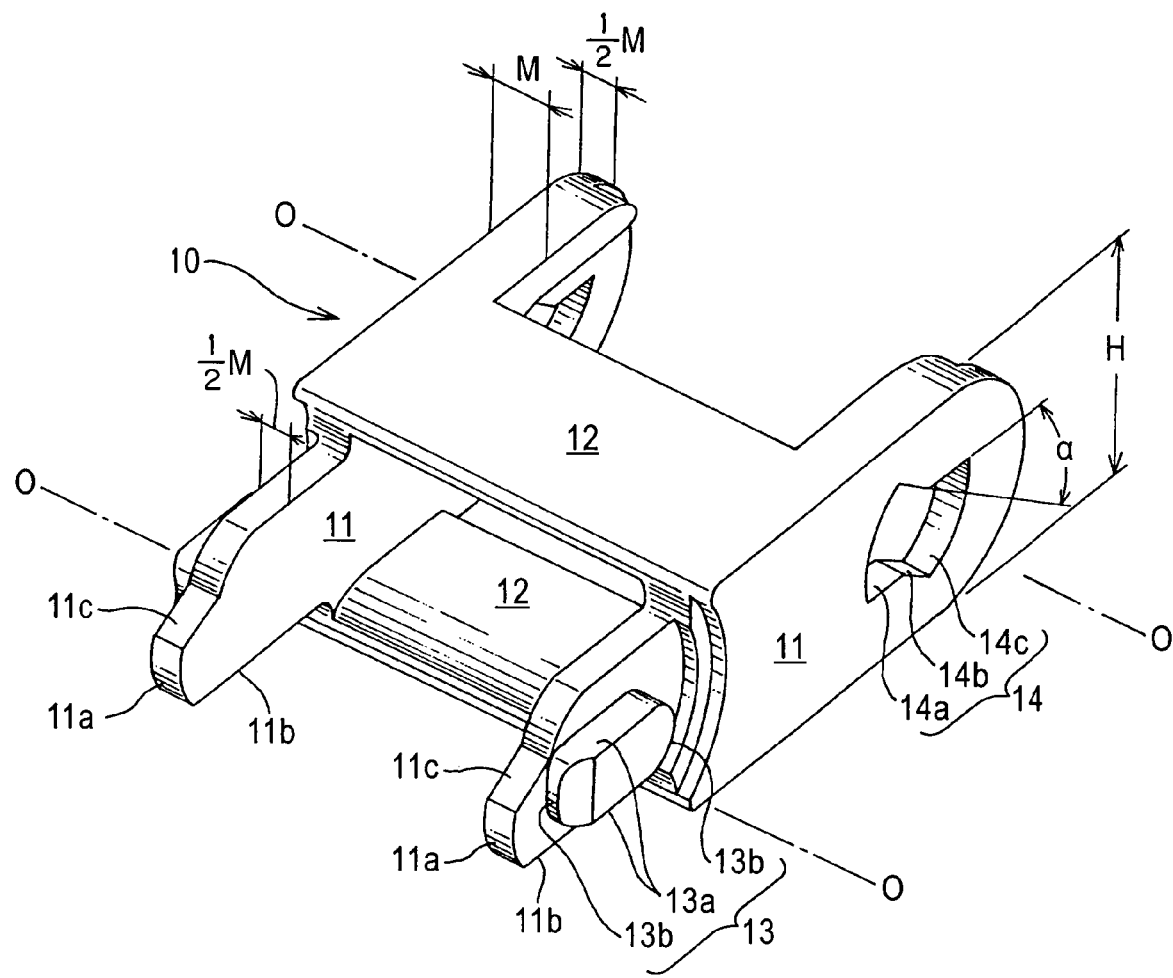
FIG. 1 is an outer view of a link body used in a cable or the like protection and guide device, which is one example of the present invention.

A better understanding of the invention will be had when reference is made to the DESCRIPTION OF THE INVENTION and CLAIMS which follow hereinbelow.

DESCRIPTION OF THE INVENTION

To protect and guide a cable or the like in a cable-inserting space where adjacent link bodies are articulably connected in large numbers, the cable or the like protection and guide device of the present invention includes a number of longitudinal cross-sectional link bodies in each of which connecting plates are provided, in a laterally bridged manner, at the upper edge center portion and the lower end portion of a pair of the respective side plates oppositely displaced on the right and left sides, and adjacent link bodies in which a connecting pin piece convexly provided on one end side of said side plate in the connecting direction toward a side, and a connecting pin hole concavely provided on the other side of said side plate in the connecting direction are mutually fitted and further the adjacent link bodies are articulably connected to each other.

Further, to suppress sliding contact noise by reliably limiting the linear position and the bending position exhibited at the movement of the cable or the like and to suppress the impact noise and wear of the connecting pin piece with respect to the connecting pin hole even if a height size of the link body is reduced, whereby tensile strength is increased and a setting space is decreased, a connecting pin piece, which connects adjacent link bodies to each other, includes a pair of upper and lower stopper surfaces, which are parallel to the upper edge center portion and the lower edge center portion of the pair of side plates oppositely disposed on the right and left sides and are oppositely disposed across a bending center point of said adjacent link bodies, and, a pair of front and rear arc-shaped outer circumferential surfaces which are continuous to said stopper surfaces and oppositely disposed across the bending center point of said adjacent link bodies. Further connecting pin hole, which connects adjacent link bodies while cooperating with said pin piece, includes a pair of linear position maintaining surfaces, which are parallel to the upper edge center portion and the lower edge center portion oppositely disposed on the right and left side, and are oppositely disposed across the bending center point of said adjacent link bodies to simultaneously abut on said pair of upper and lower stopper surfaces of said connecting pin pieces, bending position limiting surfaces, which are formed at a given bending limiting angle to said linear position maintaining surface, and are oppositely disposed across the bending center point of the adjacent link bodies in a plane symmetry to simultaneously abut on said pair of upper and lower stopper surfaces of said connecting pin pieces, and a pair of arc-shaped inner circumferential surfaces oppositely disposed across said bending center point in a plane symmetry to be rotatably brought into sliding contact with said pair of front and rear arc-shaped outer circumferential surfaces of said connecting pin pieces.

It is noted that a link body used in the cable or the like protection and guide device according to the present invention may be made of any one of a plastic and a metal. Particularly, in a case where the link body is made of a plastic, a connecting pin piece is integrally molded with the link body. However, to further suppress the impact noise due to the connecting pin piece the link body may be molded by an attachable separate member, which can select a plastic material suitable for suppressing noise.

And one end side and the other end side in the connecting direction, forming a side plate of said link body may be used if the adjacent link bodies include a step form at a degree of not-interfered with each other even if they are overlapped in nest conditions. However, to reliably fit a connecting pin piece convexly provided on a side of the above-mentioned side plate and a connecting pin hole concavely provided on the adjacent side plate to each other without being projected from each other a step form of a degree of half the plate thickness of the plate thickness is further preferred.

The shapes of the end portions of the one end side where the connecting pin piece of the side plate is convexly provided, and the other end side where the connecting pin hole is concavely provided, may each include an arc-shaped end surface at a degree of not-interfered with each other even if they are overlapped in nest conditions. However, to complement the linear position maintaining function and the bending position limiting function of the above-mentioned connecting pin piece and the connecting pin hole, shaping of a linear position complementary surface and a bending position complementary surface by removing a part of the arc-shaped end surface or the like is further preferable.

EXAMPLE

Figure 2:
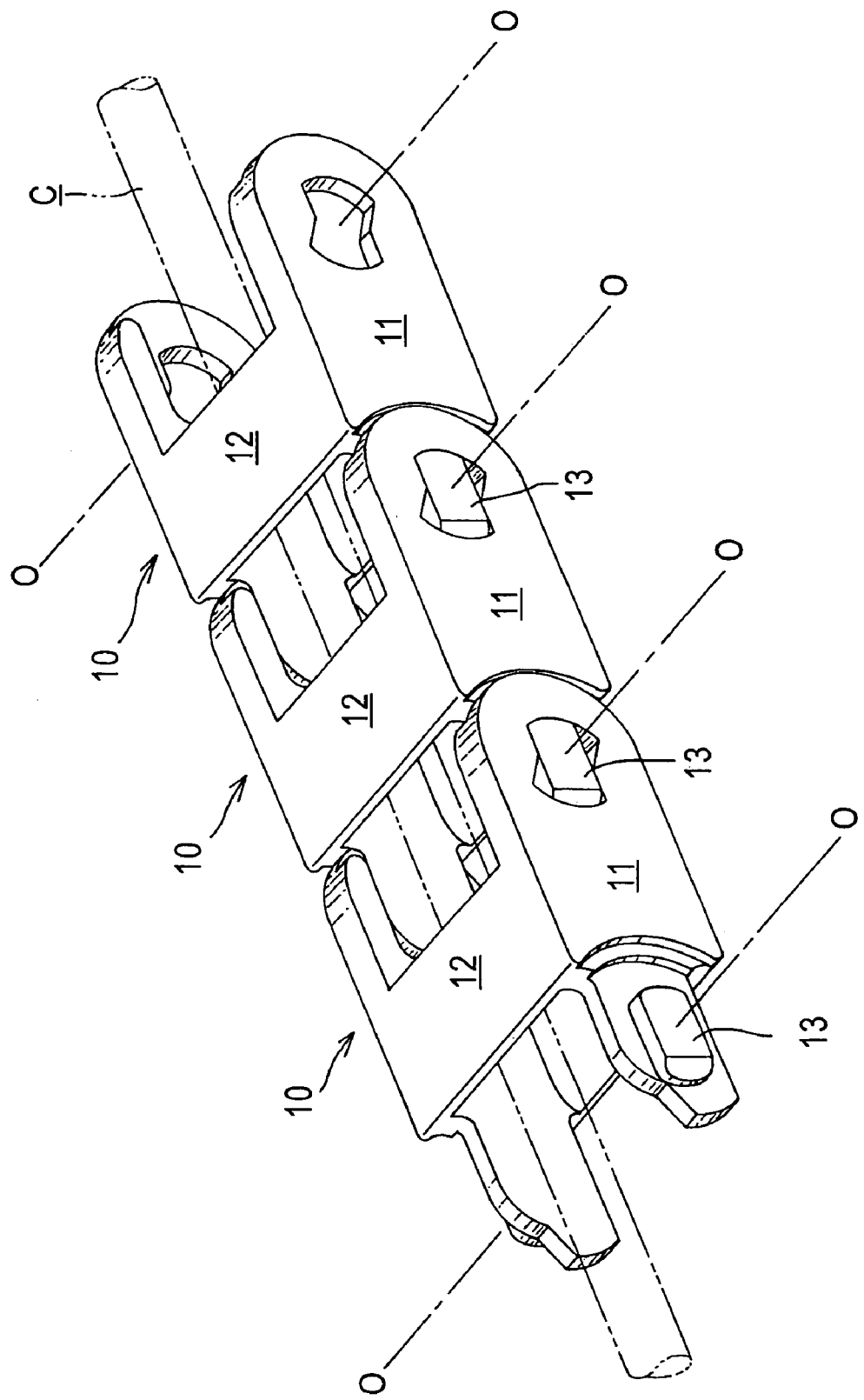
FIG. 2 is a use form showing a linear position of the cable or the like protection and guide device, which is one example of the present invention.
Figure 3:
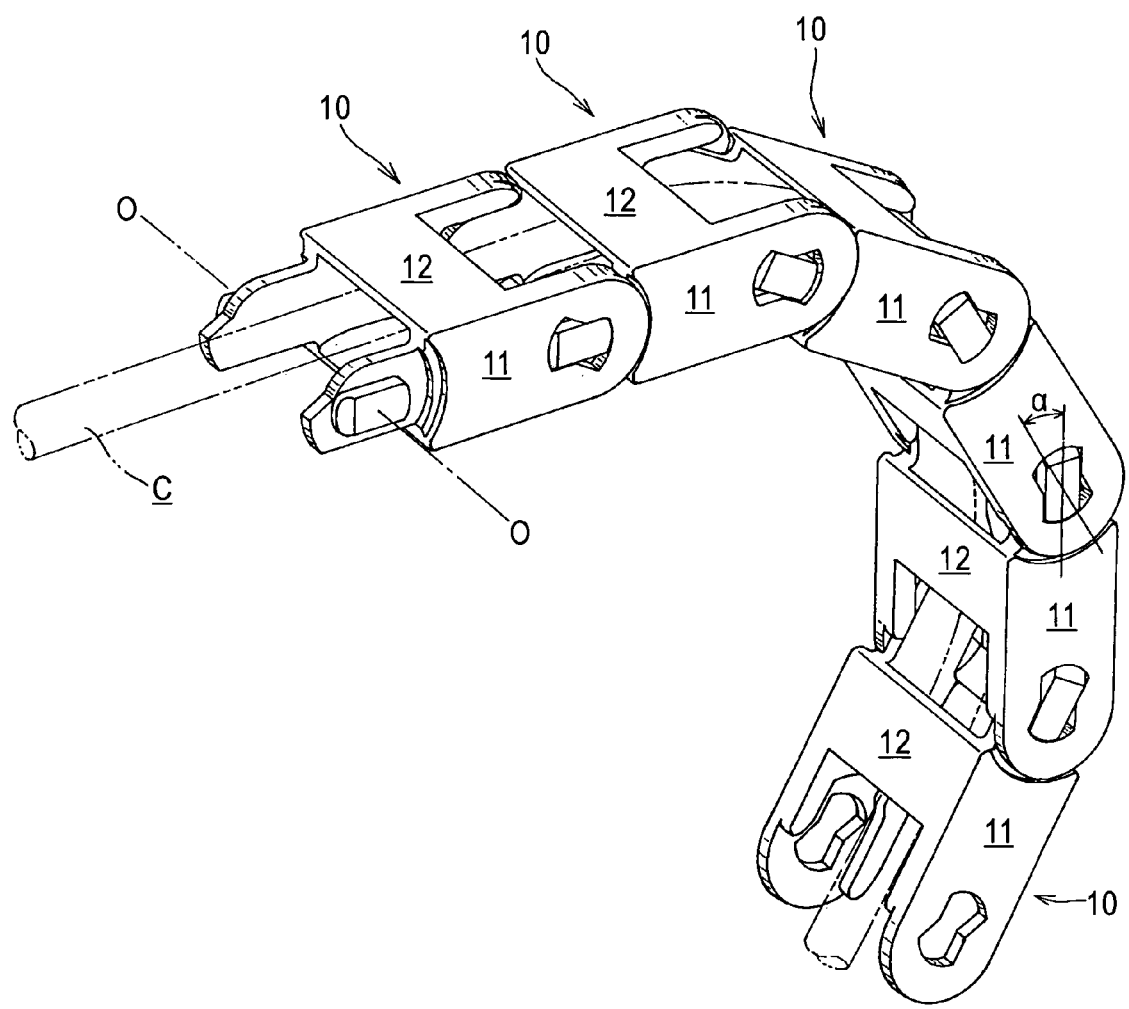
FIG. 3 is a use form showing a bending position of the cable or the like protection and guide device, which is one example of the present invention.

A cable or the like protection and guide device, which is one example of the present invention, will be described with reference to drawings. FIG. 1 is an outer view of a link body used in the cable or the like protection and guide device, which is one example of the present invention, FIG. 2 is a use mode view showing a linear position of the cable or the like protection and guide device, which is one example of the present invention, and FIG. 3 is a use mode view showing a bending position of the cable or the like protection and guide device, which is one example of the present invention.

First, to form a cable inserting space for protecting and guiding a cable or the like C consisting of a flexible body such as a cable, a hose or the like, the cable or the like protection and guide device of the present example comprises rectangular cross-sectional link bodies 10 articulably connected to each other in large numbers, each of which is molded of a synthetic resin, as shown in FIG. 1. In this rectangular link body 10, connecting plates 12, 12 are provided on the upper edge center portion and the lower edge center portion of a pair of side plates 11, 11 oppositely disposed on the right and left side (horizontally) in laterally bridged conditions. Further a connecting pin piece 13 convexly provided toward the side on one end side of each of said side plates 11, 11 in the connecting direction thereof and a connecting pin hole 14 concavely provided on the other end side of each of said side plates 11, 11 in the connecting direction thereof, are fitted to each other in adjacent link bodies.

The one end side and the other end side in the connecting direction of said side plate 11 are not interfered with each other even if adjacent link bodies 10, 10 are overlapped in nest conditions. Further, to reliably fit the connecting pin piece convexly provided on a side of the side plate 11 and the connecting pin hole 14 concavely provided in the adjacent side plate 11 to each other without being projected from each other, a step form of a degree of half the thickness M of the side plate 11 is adopted.

Next, a concrete fitting form between the connecting pin piece 13 and the connecting pin hole 14, which is the most characteristic in the cable or the like protection and guide device of the present example will be described in detail based on FIG. 1.

The connecting pin piece 13 includes a pair of upper and lower stopper surfaces 13a, 13a, which are disposed in parallel with the upper edge center portion and lower edge center portion of a pair of side plates oppositely disposed on the right and left side, and are oppositely disposed across a bending center point O between adjacent link bodies 10, 10, and a pair of front and rear arc-shaped outer circumferential surfaces 13b, 13b, which are continuous to these stopper surfaces 13a, 13a respectively and are oppositely disposed across a bending center point O between the adjacent link bodies 10.

And said connecting pin hole 14 includes linear position maintaining surfaces 14a, 14a, which are disposed in parallel with the upper edge center portion and the lower edge center portion, and oppositely disposed across a bending center point O between the adjacent link bodies 10, 10 in a plane symmetry and further maintains linear positions of the link bodies 10, 10 by simultaneously abutting on the pair of upper and lower stopper surfaces 13a, 13a; bending position limiting surfaces 14b, 14b, which are formed at a desired bending limiting angle α with respect to the linear position maintaining surfaces 14a, 14a, and are oppositely disposed across a bending center point O between the adjacent link bodies 10, 10 in a plane symmetry and further limits bending positions of the link bodies 10, 10 by simultaneously abutting on the pair of upper and lower stopper surfaces 13a, 13a; and arc-shaped inner circumferential surfaces 14c, 14c, which are oppositely disposed across a bending center point O between the adjacent link bodies 10, 10 in a plane symmetry and are rotatably brought into sliding contact with the pair of front and rear arc-shaped outer circumferential surfaces 13b, 13b of said connecting pin piece 13.

In the case of the present invention, if the shapes of the one end side of the side plate 11 where the connecting pin piece 13 is convexly provided, and of the other end side of the side plate 11 where the connecting pin hole 14 is concavely provided, include arc-shaped end surfaces 11a at a degree of not-interfered with each other even if they are pivoted in nest conditions, they may be used. In the cable or the like protection and guide device of the present example, parts of said arc-shaped end surface 11a are removed to form a linear position complementary surface 11b and a bending position complementary surface 11c so that both of the complementary surfaces 11b and 11c can complement the linear position maintaining function and the bending position limiting function by the above-mentioned connecting pin piece 13 and the connecting pin hole 14.

The thus obtained cable or the like protection and guide device of the present example not only can safely and reliably protect and guide a cable or the like C in a linear position or a bending position as shown in FIGS. 2 to 3, but also can exert the following peculiar action and effect.

That is, since the connecting pin piece 13, which connects its own link body 10 to the adjacent link body 10, includes a pair of upper and lower stopper surfaces 13a, 13a, as compared with a conventional protection and guide chain, a bending load generated in adjacent link bodies 10, 10 can be dispersed onto the pair of upper and lower stopper surfaces 13a, 13a at any time of a linear position and a bending position so that the stress concentration to the bending center point of the connecting pin piece 13 can be avoided. Thus according to the device of the present invention, impact noise, which is liable to generate in the connecting pin piece 13 can be significantly suppressed and at the same time it suppresses breakage of the connecting pin piece 13 whereby tensile strength can be ensured for a long period of time.

And since said connecting pin piece 13 includes a pair of front and rear arc-shaped outer circumferential surfaces 13b, 13b, as compared with a conventional protection and guide chain, even if the height size H of the link body 10 is decreased, a sufficiently large outer diameter size enough to rotatably sliding contact with an arc-shaped inner circumferential surface 14c of the connecting pin hole 14 can be ensured. Thus, a stable and smooth operation between the linear position and the bending position is realized and at the same time wear between the connecting pin piece 13 and the connecting pin hole 14 can be suppressed.

Further, since the connecting pin hole 14, which cooperates with said connecting pin piece 13, includes linear position maintaining surfaces 14a, the linear position maintaining surfaces are supported while abutting on the stopper surfaces 13a of the connecting pin piece 13a. Thus, a linear position exhibited at the movement of the cable or the like C can be reliably maintained. Further, since the linear position maintaining surfaces are in a spaced condition in parallel with each other in the vertical plane in a linear position through a bending position, wear and contact noise due to sliding contact, which were generated in a conventional protection and guide chain, can be avoided.

And since said connecting pin hole 14 includes bending position limiting surfaces 14b, these bending position limiting surfaces 14b are supported while abutting on the stopper surfaces 13a of the connecting pin piece 13. Further, the bending positions of the adjacent link bodies are fixedly limited at a desired bending limiting angle. Accordingly, the cable or the like C can be reliably protected and guided in a cable- inserting space where a number of adjacent link bodies 10, 10 are connected to each other while being bent.

Further, since said connecting pin hole 14 includes arc-shaped inner circumferential surfaces 14c, when the cable or the like protection and guide device of the present invention is compared with a conventional protection and guide chain, even if the height size H of the link body is decreased, a sufficiently large outer diameter size enough to rotatably sliding contact with an arc-shaped outer circumferential surface 13b of the connecting pin hole 13 can be ensured. Thus, a stable and smooth operation between the linear position and the bending position is realized and at the same time wear between the connecting pin piece 13 and the connecting pin hole 14 can be suppressed.

Further, in the cable or the like protection and guide device of the present example, parts of said arc-shaped end surface 11a are removed to form a linear position complementary surface 11b and a bending position complementary surface 11c so that both of the complementary surfaces 11b and 11c can complement the linear position maintaining function and the bending position limiting function by the above-mentioned connecting pin piece 13 and the connecting pin hole 14. Accordingly, a concentrated load to the connecting pin piece 13 is avoided so that the breakage of the connecting pin piece 13 is further suppressed, and tensile strength of the device can be ensured. Thus, the effects are very large.

Description of Reference Numerals
10 . . . Link body
11 . . . Side plate
11a . . . Arc-shaped end surface
11b . . . Linear position complementary surface
11c . . . Bending position complementary surface
12 . . . Connecting plate
13 . . . Connecting pin piece
13a . . . Stopper surface
13b . . . Arc-shaped outer circumferential surface
14 . . . Connecting pin hole
14a . . . Linear position maintaining surface
14b . . . Bending position limiting surface
14c . . . Arc-shaped inner circumferential surface
C . . . Cable or the like
O . . . Bending center point
M . . . Thickness of side plate 11
H . . . Height size
α . . . Bending limiting angle The invention has been described by way of examples only and those skilled in the art will readily recognize that certain changes and modifications may be made to the examples without departing from the spirit and scope of the appended claims.

We claim:

1. A cable protection and guide device for protecting and guiding a cable in a cable inserting space, comprising: a number of adjacent longitudinal link bodies each articulably interconnected; each of said link bodies includes a bending center point; each of said link bodies includes a pair of left and right side plates; each of said side plates includes an upper edge center portion, a lower edge center portion, an end side and another end side; a connecting plate is laterally bridged over said upper edge center portion and said lower edge center portion of said right and left side plates; each of said side plates includes a convex connecting pin piece provided on said an end side of said side plate; each of said side plates includes a concave connecting pin hole provided on said another end side of said side plate; each of said convex connecting pin pieces of each of said side plates being articulably interconnected to a respective adjacent concave connecting pin hole of said adjacent link body; each of said convex connecting pin pieces of said side plates includes a pair of upper and lower stopper surfaces which are parallel to said upper edge center portion and said lower edge center portion and oppositely disposed about said bending center point of said adjacent link bodies; each of said connecting pin pieces includes a pair of front and rear arc-shaped outer circumferential surfaces joining said stopper surfaces and being oppositely disposed about said bending center point of said adjacent link bodies; each of said connecting pin holes includes a pair of arc-shaped inner circumferential surfaces; each of said connecting pin holes includes a pair of inner linear position maintaining surfaces which are parallel to said upper edge center portion and said lower edge center portion of said side plates and are oppositely disposed about said bending center point of said adjacent link bodies simultaneously abutting said pair of upper and lower stopper surfaces of said respective connecting pin pieces; each of said connecting pin holes includes inner bending limiting surfaces which are formed at a bending limiting angle with respect to said linear maintaining surfaces and are oppositely disposed about said bending center point of said adjacent link bodies simultaneously abutting said pair of upper and lower stopper surfaces of said respective connecting pin pieces; and, each of said pair of arc-shaped inner circumferential surfaces oppositely disposed about said bending center point being rotatably in sliding contact with said pair of front and rear arc-shaped outer circumferential surfaces of said connecting pin pieces.

2. A cable protection and guide device for protecting and guiding a cable in a cable inserting space as claimed in claim 1 further wherein each of said side plates includes a linear positioning complementary surface and a bending position complementary surface.

* * * * *